Nov. 22, 1949 F. J. FAULHABER 2,489,020
GRILL SHIELD FOR AUTOMOBILES
Filed Aug. 2, 1946 2 Sheets-Sheet 1
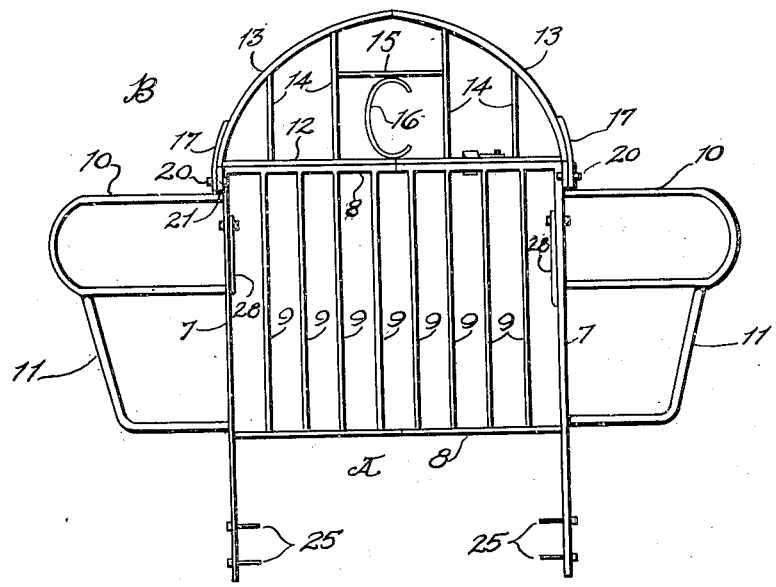
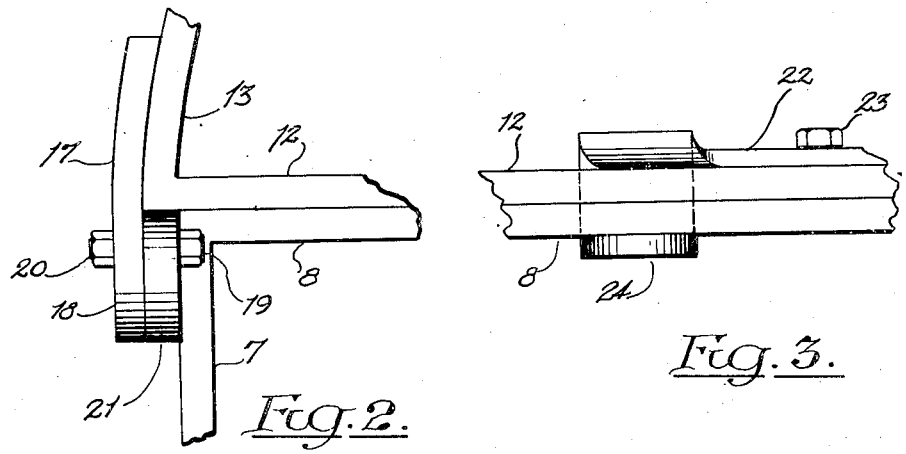
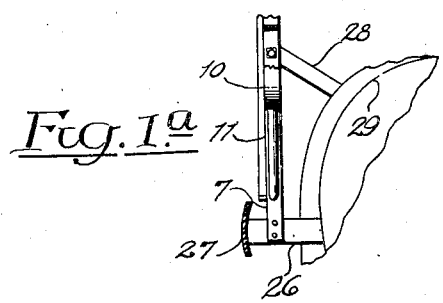
INVENTOR
Frank J. Faulhaber
BY
Francis E. Boyce
ATTORNEY

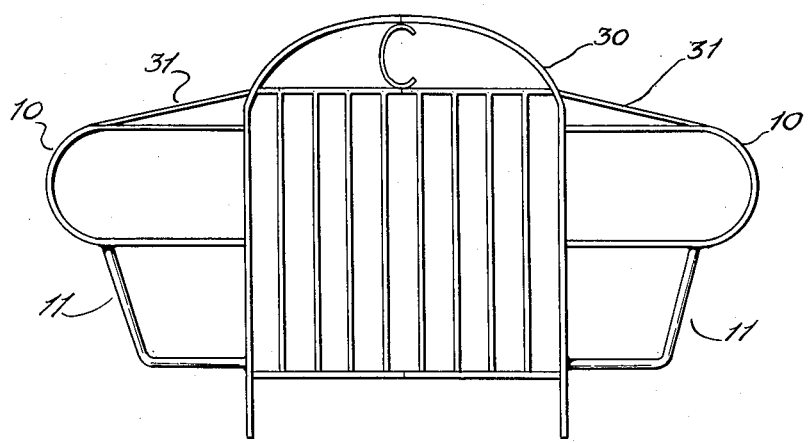
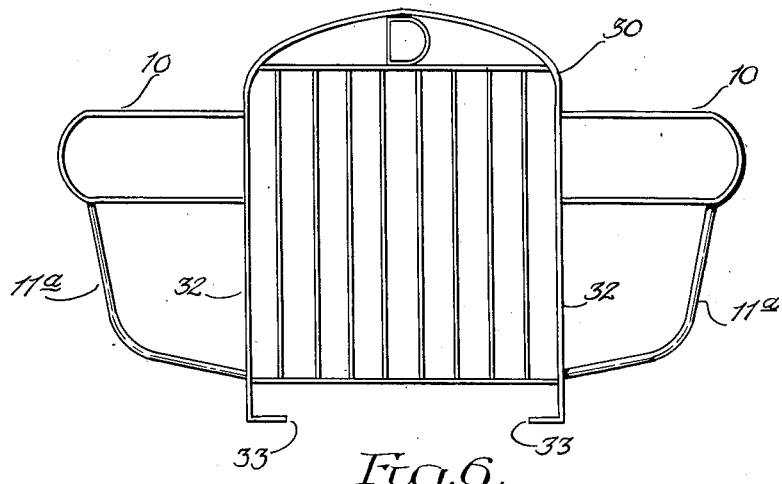
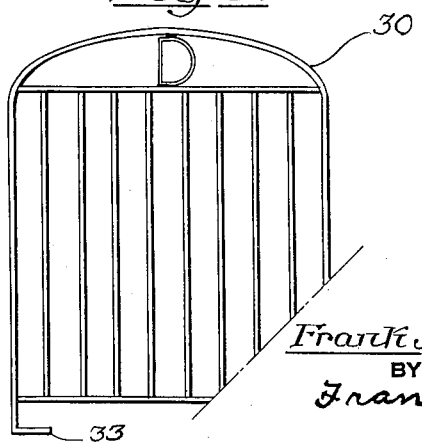

Patented Nov. 22, 1949

2,489,020

UNITED STATES PATENT OFFICE 2,489,020

GRILLE SHIELD FOR AUTOMOBILES

Frank J. Faulhaber, New York, N. Y.

Application August 2, 1946, Serial No. 687,895

1 Claim. (Cl. 293—54)

This invention relates to improvements in grill shields for automobiles, the principal object of the invention being to provide a shield of sufficient strength to protect the radiator grill, head lights and front fenders of an automobile or truck against heavy impacts.

A further object of the invention is to provide a grill shield in which the upper portion may be swung away from the grill so as to facilitate raising of the hood of the automobile.

Other objects and advantages will appear as the description proceeds.

In the drawings accompanying this specification,

Fig. 1 is a front view of one form of grill shield constructed in accordance with the present invention;

Fig. 1ª is a fragmentary end view illustrating the manner of securing the shield in position in front of the radiator grill of an automobile;

Fig. 2 is a fragmentary view on an enlarged scale illustrating the manner in which the upper and lower parts of the shield shown in Fig. 1 are hinged together;

Fig. 3 is also an enlarged detail view illustrating the means for retaining the upper and lower parts of the shield in the operative position shown in Fig. 1; and Figs. 4, 5 and 6 are front views each illustrating a modified form of shield.

Referring to the drawing in detail, and especially to Figs. 1 to 3 inclusive, the shield comprises two main frame portions, namely a lower stationary portion designated generally by A and an upper movable portion designated generally by the letter B. The lower portion A is a rectangular frame consisting of two elongated vertically extending end bars 7 to which are attached, preferably by welding, a pair of cross bars 8, and between said end bars and cross bars are disposed at regularly spaced intervals a plurality of vertical bars or fins 9, the opposite ends of said vertical bars being welded to the cross bars 8. All of the bars 7, 8 and 9 are of substantial width and thickness so as to be capable of withstanding a considerable impact.

Extending laterally from each of the vertical end members 7 is an auxiliary shield the upper portion 10 of which is of the same stock as the bars 7, 8 and 9 and is of U-shape so as to extend over and protect the head lights of a car to which the shield is attached, the free ends of said U-shaped members being secured, as by welding or otherwise, to the vertical bars 7 respectively. Below the lamp guards 10 are attached fender shields 11, these shields being preferably of cylindrical stock and each secured at one end, preferably by welding, to the under surface of its companion lamp guard 10 and at its opposite end to the vertical bar 7, all as clearly shown in Fig. 1.

The upper frame portion B is made up of material of the same stock as the lower frame and comprises a horizontal bar 12, to the opposite ends of which are secured the opposite ends of a curved or arch-shaped bar 13, and between said bars 12 and 13 are secured a plurality of vertical bars 14 disposed in spaced relation to each other, the opposite ends of said vertical bars being secured to the bars 12 and 13 respectively. The space between the bars 14 nearest the center of the length of the frame B is preferably divided by a horizontal bar 15 between which and the horizontal bar 12 may be supported an ornamental letter indicating the name or make of the car, as shown at 16 in Fig. 1.

In the form shown in Fig. 1, the upper frame portion B of the shield is hinged to the lower portion A so that it may be swung forward away from the grill thereby to permit easy access to the hood of the car for opening the same, this being especially desirable when the entire hood is lifted from the front as in some types of cars. For this purpose a pair of end members 17 are welded to the outside of the curved member 13 at the points where it intersects the horizontal bar 12, said end members 17 each carrying at its lower end a perforated ear 18 extending below said horizontal bar. The said end members are pivoted respectively to perforated members welded to the outer sides of the opposite vertical end bars 7 of the lower frame A, by means of bolts 19 passing through said perforated members and the ears 18, said bolts being provided with nuts 20 for locking the parts together, as clearly shown in Fig. 2.

For locking the upper and lower frames together I provide a locking member formed from a piece of stock similar to the vertical bars of the guard, said member being turned over and bent upon itself to form a horizontally extending arm 22 lying flat on the horizontal bar 12 of the upper frame and pivoted thereto as indicated at 23 in Figs. 1 and 3, and a portion at right angles to said bar of just sufficient length to span the thickness of the horizontal bars 12 and 8 of the upper and lower frames respectively, said portion ending in a lip 24 bent at right angles thereto and extending below the top horizontal bar 8 of the lower frame, all as shown in Figs. 1 and 3.

It will be obvious that with the locking member in the position shown in those figures the frames A and B will be held rigidly in the operative position shown in Fig. 1, and when it is desired to swing the upper frame forward it is necessary only to force the locking member back so as to swing it on its pivot until it releases its hold on the bars 8 and 12.

The guard above described is attached to an automobile body by means of bolts or rivets 25 passing through openings formed near the lower ends of the vertical bars 7, by which rivets or bolts the said vertical bars may be secured to the brackets 26 (Fig. 1a) on which the bumper 27 of the car is mounted. Side stays 28 are also provided each of which may be secured at one end to the respective vertical end bars 7 near the upper end thereof, said stays extending at an acute angle from said bars and passing into the body of the car 29, either through the grill or otherwise, and secured at their opposite ends to the chassis frame.

It will be understood that the horizontal and curved members of the top frame may be made in two parts each comprising a bar bent to form half of the horizontal bar 12 and half of the curved bar 13, said halves being welded together at their meeting ends.

In Fig. 4 is shown a form of grill shield 30 which differs from that shown in Fig. 1 only in the fact that the upper and lower frames are contained in a single rigid structure, the same being provided with auxiliary headlight and fender guards 10 and 11 similar to those shown in Fig. 1, additional stays 31 being secured between the main and auxiliary frames. In Figs. 5 and 6 is shown a shield frame 30 similar to that of Fig. 4, the shield in Fig. 5 having similar head light guards 10, the fender guards 11a however being of somewhat different form to suit cars having different forms of fenders, while in Fig. 6 the guard frame is shown without any head light or fender guards. In the shield shown in Figs. 5 and 6 the lower ends of the opposite side bars 32 of the frame are bent inward at right angles as indicated at 33, to hook below the bumper brackets or other parts of the chassis frame.

The shield herein described, in addition to its protecting value, because of the fin-like character of its vertical bars, encourages the flow of air to the radiator of the automobile.

Having thus described my invention, what I claim is:

A combined grill, headlight and fender shield for motor vehicles including means to rigidly support the same at the front of a vehicle and in spaced relationship to the vehicle grill, headlights, and fenders, comprising a rigid unit including a grill shielding section consisting of a main frame having interconnected top, bottom and side members, a plurality of spaced, parallel, flat, uninterrupted bars secured at their opposite ends to opposite points of two opposed frame members, with their narrow edges facing the direction of travel of the vehicle, substantially U-shaped headlight shielding sections, the ends of the legs of which abut and are rigidly secured at opposite spaced points to spaced side members adjacent the top of the frame and in front of the head-lights of the vehicle, thus defining an open, unobstructed area to allow uninterrupted projection of the headlight beams therethrough, and fender shielding members each including a substantially horizontally disposed portion the inner end of each of which is fixedly secured to the opposite side members of the frame adjacent the bottom member of the frame, and which portions are elongated and extend across and in front of a substantial area of each fender to protect the same, and a substantially vertically disposed portion as a continuation of the outer end of each horizontal portion and extending to and fixed to each headlight shielding section adjacent the free end thereof to reinforce and support same, the fender shielding members being of one piece construction disposed in the same vertical plane as the headlight shielding sections and the horizontal portions of the said fender shielding sections being parallel with both legs of the respective U-shaped headlight shielding sections, and a shielding section for the front of the vehicle hood comprising an auxiliary protecting frame pivotally attached to the main frame and wherein means are provided for securing the main and auxiliary frames together in vertical alignment.

FRANK J. FAULHABER.

REFERENCES CITED

The following references are of record in the file of this patent:

UNITED STATES PATENTS

| Number | Name | Date |
|---|---|---|
| 1,411,121 | Michaels | Mar. 28, 1922 |
| 1,574,102 | McGregor | Feb. 23, 1926 |
| 1,687,337 | Jaeger | Oct. 9, 1928 |
| 1,884,228 | Raskin | Oct. 25, 1932 |
| 2,189,169 | Cox | Feb. 6, 1940 |
| 2,396,652 | Heilman | Mar. 19, 1946 |
| 2,441,132 | Blakey | May 11, 1948 |